(12) United States Patent
Hang et al.

(10) Patent No.: US 11,172,499 B2
(45) Date of Patent: Nov. 9, 2021

(54) INFORMATION TRANSMISSION METHOD, APPARATUS, AND SYSTEM

(71) Applicant: HUAWEI TECHNOLOGIES CO., LTD., Guangdong (CN)

(72) Inventors: Haicun Hang, Shanghai (CN); Ye Wu, Shanghai (CN); Qian Zhang, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/579,240

(22) Filed: Sep. 23, 2019

(65) Prior Publication Data

US 2020/0022169 A1    Jan. 16, 2020

Related U.S. Application Data

(63) Continuation of application No. PCT/CN2018/078753, filed on Mar. 12, 2018.

(30) Foreign Application Priority Data

Mar. 23, 2017   (CN) .......................... 201710178989.9

(51) Int. Cl.
*H04W 72/12* (2009.01)
*H04L 1/00* (2006.01)
(Continued)

(52) U.S. Cl.
CPC ....... *H04W 72/1273* (2013.01); *H04L 1/0038* (2013.01); *H04W 72/042* (2013.01); *H04W 80/02* (2013.01)

(58) Field of Classification Search
CPC ........... H04W 72/1273; H04W 72/042; H04W 80/02; H04W 72/1289; H04L 1/0038;
(Continued)

(56) References Cited

U.S. PATENT DOCUMENTS

2012/0155316 A1\*  6/2012  Li ................... H04L 5/0053
                                                        370/252
2012/0243499 A1\*  9/2012  Moon ............... H04L 5/0053
                                                        370/329
(Continued)

FOREIGN PATENT DOCUMENTS

CN         101702828 A      5/2010
CN         102347919    *   8/2010
(Continued)

OTHER PUBLICATIONS

CATT: "Principle of DL DCI formats design", 3GPP Draft; R1-1508793, vol. RAN WG1 No. Lisbon, Portugal Oct. 10, 2016-Oct. 14, 2016, Oct. 9, 2016, XP051148848, 4 pages.
(Continued)

*Primary Examiner* — Jae Y Lee
*Assistant Examiner* — Chuong M Nguyen
(74) *Attorney, Agent, or Firm* — Womble Bond Dickinson (US) LLP

(57) ABSTRACT

This application discloses an information transmission method, apparatus, and system, and belongs to the field of communications technologies. The method includes: generating, by a base station, amount indication information, where the amount indication information is used to indicate a maximum amount of downlink control information; sending, by the base station, the amount indication information to user equipment; receiving, by the user equipment, the amount indication information; and receiving, by the user equipment, downlink control information based on the amount indication information. In this application, the amount indication information is sent to the user equipment, so that the user equipment receives the downlink control information based on the amount indication information. This can resolve a problem that complexity of blind detection performed by the user equipment is relatively high, (Continued)

thereby reducing the complexity of the blind detection performed by the user equipment.

13 Claims, 8 Drawing Sheets

(51) Int. Cl.
*H04W 72/04* (2009.01)
*H04W 80/02* (2009.01)

(58) Field of Classification Search
CPC ..... H04L 5/0091; H04L 5/0053; H04L 5/005; H04L 5/0051
See application file for complete search history.

(56) References Cited

U.S. PATENT DOCUMENTS

| | | | | |
|---|---|---|---|---|
| 2013/0016655 | A1* | 1/2013 | Heo | H04L 5/0053 370/328 |
| 2013/0016672 | A1* | 1/2013 | Yang | H04L 5/0053 370/329 |
| 2013/0070690 | A1* | 3/2013 | Moon | H04L 5/0053 370/329 |
| 2014/0105158 | A1* | 4/2014 | Kim | H04L 1/1854 370/329 |
| 2014/0341143 | A1* | 11/2014 | Yang | H04L 5/001 370/329 |
| 2015/0092728 | A1* | 4/2015 | Wang | H04L 5/0048 370/329 |
| 2015/0124724 | A1* | 5/2015 | Yang | H04W 72/042 370/329 |
| 2018/0139024 | A1 | 5/2018 | Shi et al. | |
| 2020/0383091 | A1* | 12/2020 | Park | H04L 5/0048 |

FOREIGN PATENT DOCUMENTS

| | | | |
|---|---|---|---|
| CN | 102347919 | A * | 8/2010 |
| CN | 102347919 | A | 2/2012 |
| CN | 103227694 | A | 7/2013 |
| CN | 106301671 | A | 1/2017 |
| EP | 2806573 | A1 | 11/2014 |
| WO | 2011162522 | A9 | 4/2012 |
| WO | 2013042991 | A1 | 3/2013 |
| WO | 2016108505 | A1 | 7/2016 |

OTHER PUBLICATIONS

Intel Corporation:"NR frame Structure for forward compatibility", 3GPP DRAFT;R1-1609509, vol. RAN WG1, No. Lisbon, Portugal; Oct. 10, 2016-Oct. 24, 2016, Oct. 9, 2016, XP051149548, 4 pages.

* cited by examiner

INFORMATION TRANSMISSION METHOD, APPARATUS, AND SYSTEM

CROSS-REFERENCE TO RELATED APPLICATIONS

This application is a continuation of International Application No. PCT/CN2018/078753, filed on Mar. 12, 2018, which claims priority to Chinese Patent Application No. 201710178989.9, filed on Mar. 23, 2017. The disclosures of the aforementioned applications are hereby incorporated by reference in their entireties.

TECHNICAL FIELD

This application relates to the field of communications technologies, and in particular, to an information transmission method, apparatus, and system.

BACKGROUND

A long term evolution (Long Term Evolution, LTE) or long term evolution-advanced (Long term evolution-advanced, LTE-A) communications system usually includes user equipment (User Equipment, UE) and a base station that can schedule the UE. The base station may encapsulate scheduling information for the UE into downlink control information (Downlink Control Information, DCI), and send the DCI to the UE through a physical downlink control channel (Physical Downlink Control Channel, PDCCH).

Currently, in a 5th Generation (Fifth Generation, 5G) communications system, within one scheduling period, a plurality of base stations may schedule same UE. All of the plurality of base stations may separately encapsulate scheduling information of the base stations for the UE into downlink control information and separately send the downlink control information to the UE through a PDCCH. The PDCCH includes common search space and UE-specific search space. The UE may perform blind detection on all control channel elements (Control Channel Element, CCE) in the common search space and the UE-specific search space, to receive the downlink control information sent by the plurality of base stations.

However, because the UE should perform blind detection on all the CCEs in the common search space and the UE-specific search space, complexity of the blind detection performed by the UE is relatively high.

SUMMARY

To resolve a problem that complexity of blind detection performed by UE is relatively high, embodiments of the present disclosure provide an information transmission method, apparatus, and system. The technical solutions are as follows:

According to one embodiment, an information transmission method is provided. The method includes:

generating amount indication information, where the amount indication information is used to indicate a maximum amount of downlink control information; and sending the amount indication information to user equipment.

According to the information transmission method provided in this embodiment of the present disclosure, a base station sends the amount indication information to the user equipment, so that the user equipment receives downlink control information based on the amount indication information. This can resolve a problem that complexity of blind detection performed by the user equipment is relatively high, thereby reducing the complexity of the blind detection performed by the user equipment.

Optionally, the sending the amount indication information to user equipment includes: sending the amount indication information to the user equipment by using link layer signaling.

According to one embodiment, an information transmission method is provided. The method includes:

receiving amount indication information, where the amount indication information is used to indicate a maximum amount of downlink control information; and receiving downlink control information based on the amount indication information.

According to the information transmission method provided in this embodiment of the present disclosure, user equipment receives the amount indication information, and receives the downlink control information based on the amount indication information. This can resolve a problem that complexity of blind detection performed by the user equipment is relatively high, thereby reducing the complexity of the blind detection performed by the user equipment.

Optionally, the receiving amount indication information includes: receiving the amount indication information sent by using link layer signaling.

Optionally, in some embodiments, the downlink control information comes from at least one base station.

Optionally, in some embodiments, the downlink control information includes at least one type of common downlink control information and user equipment-specific downlink control information.

Optionally, in some embodiments, the downlink control information includes the common downlink control information and the user equipment-specific downlink control information; and the amount indication information is used to indicate a maximum amount of common downlink control information and a maximum amount of user equipment-specific downlink control information; or the amount indication information is used to indicate a sum of a maximum amount of common downlink control information and a maximum amount of user equipment-specific downlink control information.

Optionally, in some embodiments, the link layer signaling includes data link layer signaling or radio link layer signaling.

According to one embodiment, an information transmission apparatus is provided. The information transmission apparatus includes at least one module, and the at least one module is configured to implement the information transmission method according to some embodiments.

According to one embodiment, an information transmission apparatus is provided. The information transmission apparatus includes at least one module, and the at least one module is configured to implement the information transmission method according to some embodiments.

According to one embodiment, a base station is provided. The base station includes a processor, a transmitter, a receiver, and a network interface. The processor, the transmitter, the receiver, and the network interface are connected by using a bus.

The processor includes one or more processing cores. The processor implements various functional applications and data processing by running a software program and a unit.

There may be a plurality of network interfaces. The network interface is used by the base station to communicate with another storage device or network device.

The processor and the transmitter are configured to cooperatively implement the information transmission method according to some embodiments.

According to one embodiment, user equipment is provided. The user equipment includes a receiver, a processor, a transmitter, and a network interface. The receiver, the processor, the transmitter, and the network interface are connected by using a bus.

The processor includes one or more processing cores. The processor implements various functional applications and data processing by running a software program and a unit.

There may be a plurality of network interfaces. The network interface is used by the user equipment to communicate with another storage device or network device.

The receiver and the processor are configured to cooperatively implement the information transmission method according to some embodiments.

According to one embodiment, a computer readable storage medium is provided. The computer readable storage medium stores an instruction, and when the computer readable storage medium runs on a computer, the computer performs the information transmission method according to some embodiments.

According to one embodiment, a computer readable storage medium is provided. The computer readable storage medium stores an instruction, and when the computer readable storage medium runs on a computer, the computer performs the information transmission method according to some embodiments.

According to one embodiment, a computer program product including an instruction is provided. When the computer program product runs on a computer, the computer performs the information transmission method according to some embodiments.

According to one embodiment, a computer program product including an instruction is provided. When the computer program product runs on a computer, the computer performs the information transmission method according to some embodiments.

According to one embodiment, an information transmission system is provided. The information transmission system includes a base station and user equipment.

In a possible implementation, the base station includes the information transmission apparatus according to some embodiments, and the user equipment includes the information transmission apparatus according to some embodiments.

In some embodiments, the base station is the base station according to one embodiment, and the user equipment is the user equipment according to aspect different embodiment.

Beneficial effects brought by the technical solutions provided in the embodiments of the present disclosure are as follows:

According to the information transmission method, apparatus, and system that are provided in the embodiments of the present disclosure, the base station sends the amount indication information to the user equipment, so that the user equipment receives the downlink control information based on the amount indication information. This can resolve a problem that complexity of blind detection performed by the user equipment is relatively high, thereby reducing the complexity of the blind detection performed by the user equipment.

DESCRIPTION OF EMBODIMENTS

Figure 1:
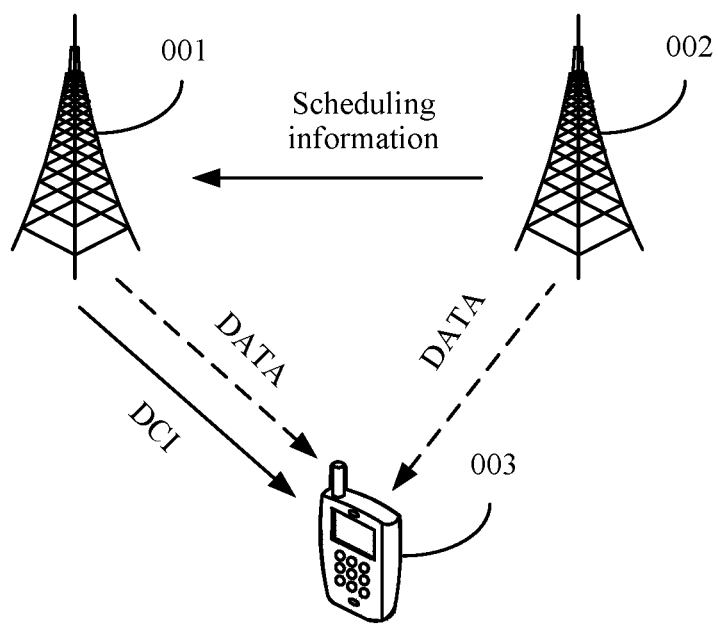
FIG. 1 is a schematic diagram of a CoMP/FeCoMP communications system according to a related technology.

To make the objectives, technical solutions, and advantages of this application clearer, the following further describes the implementations of this application in detail with reference to the accompanying drawings.

An LTE/LTE-A communications system usually includes a base station and UE. Information may be transmitted between the base station and the UE, and communication between the base station and the UE is classified into uplink communication and downlink communication. In downlink communication, the information transmitted between the base station and the UE may include downlink data information and downlink control information.

In downlink communication, the base station may encapsulate data information into radio resource control (Radio Resource Control, RRC) signaling, and send the RRC signaling to the UE through a physical downlink shared channel (Physical Downlink Share Channel, PDSCH); and the base station may encapsulate control information (for example, scheduling information) into DCI, and then add the DCI to a PDCCH and send the DCI to the UE through the PDCCH. The control information is used to indicate a time-frequency resource occupied by the data information. The UE performs blind detection on the PDCCH to receive the DCI, and then demodulates and decodes the DCI to obtain the control information from the DCI; and determines, based on the control information, the time-frequency resource occupied by the data information, and then receives the data information on the time-frequency resource occupied by the data information. Therefore, it can be learned that the DCI should be very reliable, and when the DCI is correctly decoded, the UE can accurately obtain the time-frequency resource occupied by the data information.

One PDCCH usually occupies a plurality of control channel elements (Control Channel Element, CCE), and the PDCCH usually includes common (Common) search space and user equipment-specific (UE specific) search space. DCI carried in the common search space is common DCI, and usually information in the common DCI is mainly system information, system information update information, paging information, and the like. DCI carried in the user equipment-specific search space is UE specific DCI, and information in the UE specific DCI is mainly related UE-specific scheduling information. The base station may determine, based on a factor such as channel quality, a quantity of CCEs occupied by a PDCCH, a quantity of CCEs occupied by common search space in the PDCCH, and a quantity of CCEs occupied by user equipment-specific search space in the PDCCH. When performing blind detection on the PDCCH, the UE may perform blind detection on all possible CCEs in the common search space and the user equipment-specific search space. After blindly detecting DCI of the UE, the UE further obtains content in the DCI through demodulation.

It should be noted that, in the LTE/LTE-A communications system, within one scheduling period, each UE may have only one piece of UE-specific DCI, and in a blind detection process, the UE stops blind detection once blindly detecting the UE-specific DCI of the UE. If a plurality of base stations simultaneously schedule one UE within one scheduling period, the plurality of base stations may schedule the UE through coordinated scheduling, and a corresponding LTE/LTE-A communications system is a coordinated multipoint (Coordinate Multi-point, CoMP) or further enhanced coordinated multipoint (Further enhancement CoMP, FeCoMP) communications system. Regardless of whether the CoMP/FeCoMP communications system is used in uplink communication or downlink communication, communications system performance can be improved, and in particular, cell-edge spectral efficiency can be improved.

In the CoMP/FeCoMP communications system, one of the plurality of base stations scheduling the same UE is a serving base station, and all the other base stations are coordinated base stations. The coordinated base stations may send scheduling information of the coordinated base stations for the UE to the serving base station over backhaul links. Then, the serving base station encapsulates the received scheduling information and scheduling information of the serving base station for the UE into DCI, maps the DCI onto a PDCCH according to a specific rule, and sends the DCI to the UE through the PDCCH. The UE may select a DCI format (format) to perform blind detection on possible CCEs in the PDCCH. After the UE blindly detects DCI of the UE, the UE stops the blind detection, and obtains scheduling information based on the blindly detected DCI. Then, the UE can receive data information based on the scheduling information. For example, FIG. 1 is a schematic diagram of a CoMP/FeCoMP communications system. Referring to FIG. 1, a base station 001 and a base station 002 are two base stations that schedule UE-003 within a same scheduling period, the base station 001 is a serving base station, and the base station 002 is a coordinated base station. The base station 002 sends scheduling information of the base station 002 for the UE-003 to the base station 001 over a backhaul link. After receiving the scheduling information, the base station 001 integrates and encapsulates the scheduling information and scheduling information of the base station 001 for the UE-003 into DCI, and sends the DCI to the UE-003 through a PDCCH. The UE-003 performs blind detection on the PDCCH to receive the DCI, and then determines scheduling information based on the DCI. The scheduling information may include the scheduling information of the base station 001 and the scheduling information of the base station 002. After determining the scheduling information, the UE-003 may determine a scheduling resource based on the scheduling information, and receive, based on the scheduling resource, data (DATA) information sent by the base station 001 and the base station 002. However, because a transmission latency of the backhaul link is usually greater than one scheduling period, in the CoMP/FeCoMP communications system, information exchanged between the serving base station and the UE may be expired (invalid) information.

To overcome the problem in the CoMP/FeCoMP communications system and enable a plurality of base stations to schedule same UE within a same scheduling period, according to a 5G communication discussion, the plurality of base stations scheduling the same UE within the same scheduling period may separately send downlink control information (for example, LTE DCI) to the UE. In this case, there are a plurality of pieces of downlink control information for the UE. In this case, if the UE stops blind detection after blindly detecting one piece of downlink control information of the UE, some downlink control information may be neglected in the blind detection; or if the UE continues blind detection after blindly detecting one piece of downlink control information of the UE, because the UE does not know an amount of possible downlink control information, the UE should perform blind detection on all possible CCEs, and in this case, complexity of the blind detection is very high.

Figure 2:
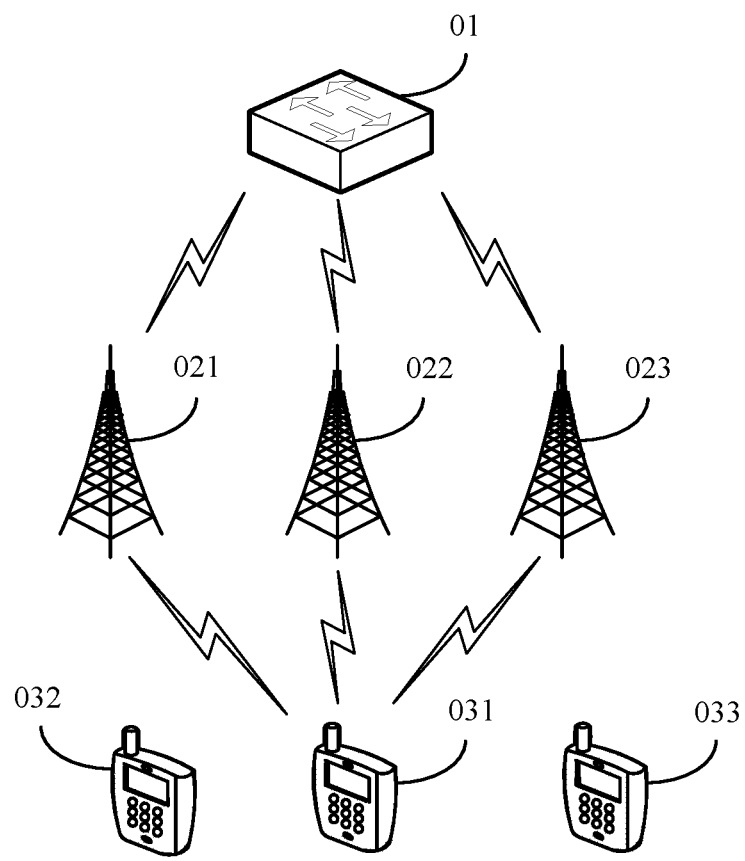
FIG. 2 is a schematic structural diagram of an implementation environment to which the embodiments of the present disclosure are applied.

FIG. 2 is a schematic structural diagram of an implementation environment to which the embodiments of the present disclosure are applied. The implementation environment includes: a network-side device, a plurality of transmitting and receiving point (Transmitting and Receiving Point, TRP) devices, and a plurality of user equipments. A communications connection is set up between the network-side device and each of the plurality of TRP devices. Communications connections may be set up between the plurality of TRP devices and the plurality of user equipments. Each TRP device may be connected to at least one of the plurality of user equipments. Each user equipment may be connected to at least one of the plurality of TRP devices. The network-side device can control and manage the plurality of TRP devices and the plurality of user equipments. In the implementation environment of this application:

The network-side device may be a network controller, a network manager, or the like.

The TRP device is, for example, but is not limited to a base transceiver station (Base Transceiver Station, BTS) in a global system for mobile communications (Global System for Mobile Communication, GSM), an NB (NodeB) in a wideband code division multiple access (Wideband Code Division Multiple Access, WCDMA) system, an evolved NodeB (evolved NodeB, eNB) in LTE, a relay node, an in-vehicle device, a wearable device, an access network device in a future 5G communications system, or an access network device in a future evolved public land mobile network (Public Land Mobile Network, PLMN) network.

The user equipment may be UE in a general sense. In addition, the user equipment may be a mobile console, an access terminal, a subscriber unit, a subscriber station, a mobile station, a remote station, a remote terminal, a mobile device, a user terminal, a terminal, a wireless communications device, a user agent, a user apparatus, or the like. The user equipment may be a cellular phone, a cordless telephone set, a session initiation protocol (Session Initiation Protocol, SIP) phone, a wireless local loop (Wireless Local Loop, WLL) station, a handheld device having a wireless communication function, a computing device, another processing device connected to a wireless modem, an in-vehicle device, a wearable device, a mobile console in a future 5G network, a terminal device in a future evolved PLMN network, or the like. In addition, the user equipment may alternatively include a relay (Relay) or another device that can communicate with an access network device.

As shown in FIG. 2, the implementation environment of this application is described by using an example in which the network-side device is a network controller 01, the TRP device is a base station and a plurality of base stations include a base station 021, a base station 022, and a base station 023, and the user equipment is UE and a plurality of UEs include UE-031, UE-032, and UE-033. In this application, the plurality of base stations may schedule the plurality of UEs, and within one scheduling period, one base station may schedule at least one UE (for example, two UEs), and at least one base station (for example, three base stations) may schedule same UE. When scheduling UE, a base station may send scheduling information to the UE. During specific implementation, the base station may encapsulate the scheduling information into downlink control information, and send the downlink control information to the UE through a PDCCH. The UE performs blind detection on the PDCCH to receive the downlink control information, and then receives the scheduling information.

This application mainly describes a case in which at least one base station schedules same UE within one scheduling period. The implementation environment of this application is described by using an example in which the base station 021, the base station 022, and the base station 023 schedule the UE-031. Details are as follows:

The network controller 01 may predict a maximum quantity of base stations scheduling the UE-031 within a preset time period, and then send the maximum quantity to any base station (for example, the base station 021) scheduling the UE-031 within the preset time period. The base station 021 may generate amount indication information based on the maximum quantity, and then send the amount indication information to the UE-031. The amount indication information is used to indicate a maximum amount of downlink control information for same UE (for example, the UE-031) within a preset time period. After receiving the amount indication information, the UE-031 may receive downlink control information based on the amount indication information. The downlink control information received by the UE-031 based on the amount indication information may be downlink control information from at least one base station. In the implementation environment of this application, because the base station 021, the base station 022, and the base station 023 schedule the UE-031, the maximum quantity predicted by the network controller 01 is 3, and the maximum amount that is of downlink control information for the UE-031 and that is indicated by the amount indication information generated by the base station 021 is 3. When receiving the downlink control information based on the amount indication information, the UE-031 may perform blind detection on a PDCCH. When an amount of blindly detected downlink control information is equal to the amount (for example, 3) indicated by the amount indication information, the UE-031 stops the blind detection. In this case, the downlink control information blindly detected by the UE-031 is downlink control information from at least one of the base station 021, the base station 022, and the base station 023.

Figure 3:
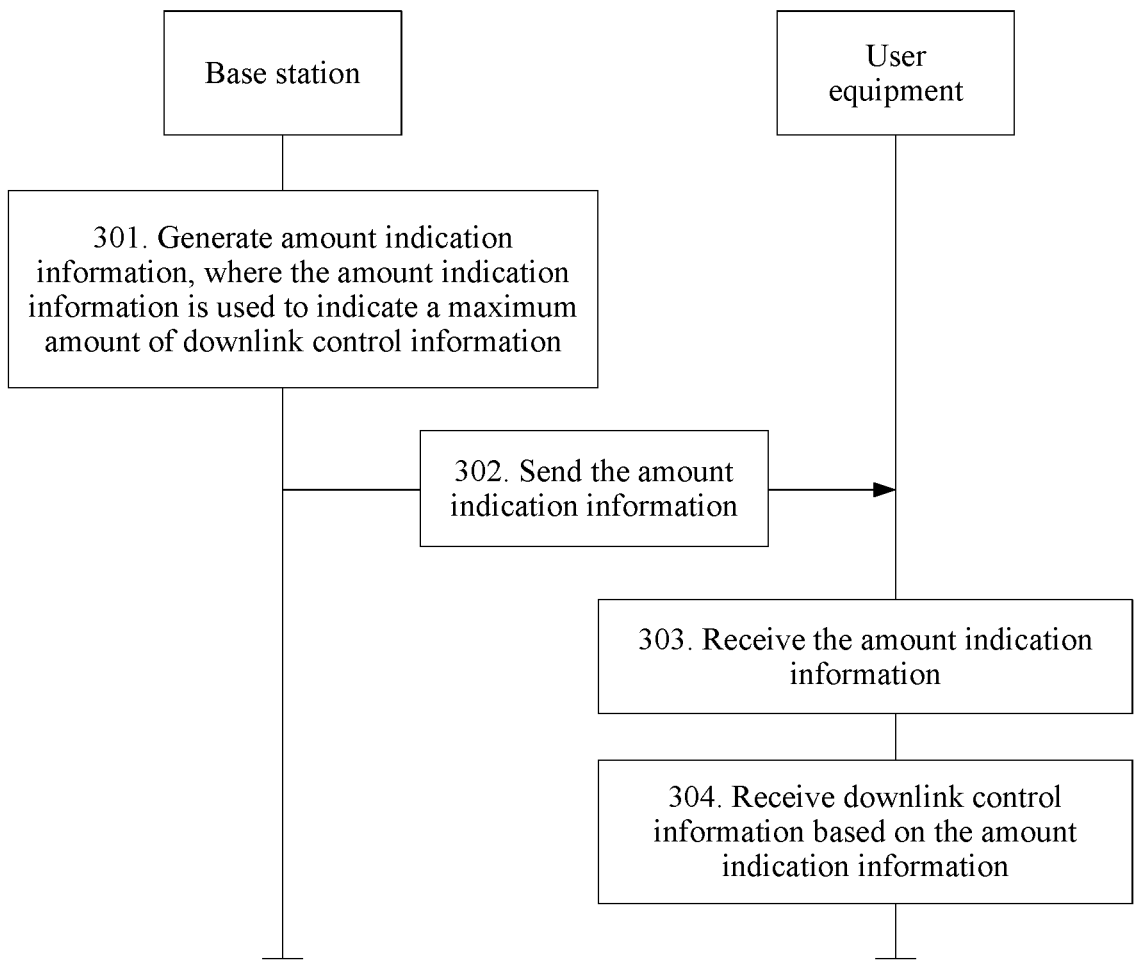
FIG. 3 is a method flowchart of an information transmission method according to an embodiment of the present disclosure.

FIG. 3 is a method flowchart of an information transmission method according to an embodiment of the present disclosure. The information transmission method may be used in the implementation environment shown in FIG. 2. Referring to FIG. 3, the information transmission method may include the following actions, operations, methods, functions, blocks, etc.

Block 301: A base station generates amount indication information, where the amount indication information is used to indicate a maximum amount of downlink control information.

In this embodiment of the present disclosure, the base station may obtain a maximum quantity of base stations scheduling same user equipment within a preset time period, and then generates the amount indication information based on the maximum quantity. The amount indication information is used to indicate the maximum amount of downlink control information, and specifically indicates a maximum amount of downlink control information for the same user equipment within the preset time period. The downlink control information is, for example, LTE DCI, the base station may be any base station in the implementation environment shown in FIG. 2, and the user equipment may be any UE in the implementation environment shown in FIG. 2. This embodiment of the present disclosure is described by using an example in which the base station is the base station 021 in the implementation environment shown in FIG. 2 and the user equipment is the UE-031 in the implementation environment shown in FIG. 2. In this case, the base station 021 may obtain a maximum quantity of base stations scheduling the UE-031 within a preset time period, and then generate amount indication information based on the maximum quantity. The amount indication information is used to indicate a maximum amount of downlink control information for the UE-031 within the preset time period. It should be noted that the base station 021 may be a base station scheduling the UE-031 within the preset time period, or may not be a base station scheduling the UE-031 within the preset time period. This is not limited in this embodiment of the present disclosure. Optionally, the base station 021 is a base station scheduling the UE-031 within the preset time period. The preset time period is a time period between a moment at which the user equipment currently receives amount indication information and a moment at which the user equipment receives amount indication information next time. Therefore, it can be learned that the preset time period usually changes. This is not limited in this embodiment of the present disclosure.

Optionally, in this embodiment of the present disclosure, the downlink control information may be downlink control information from at least one base station. When the downlink control information comes from at least two base stations, the amount indication information is used to indicate a sum of maximum amounts of downlink control information from the at least two base stations.

Optionally, in this embodiment of the present disclosure, the downlink control information includes at least one type of common downlink control information and user equipment-specific downlink control information. The common downlink control information is usually carried in common search space in a PDCCH, and may be system information, system information update information, paging information, and the like. The user equipment-specific downlink control information is usually carried in user equipment-specific search space in the PDCCH, and is usually related user equipment-specific scheduling information.

In this embodiment of the present disclosure, when the downlink control information includes either one type of the common downlink control information and the user equipment-specific downlink control information, the amount indication information is used to indicate a maximum amount of the one type of downlink control information, and is specifically used to indicate a maximum amount of the one type of downlink control information for the same user equipment within the preset time period. For example, when the downlink control information includes the common downlink control information, the amount indicated by the amount indication information is 3, and when the user equipment is the UE-031 in the implementation environment shown in FIG. 2, the amount indication information is used to indicate that a maximum amount of common downlink control information for the UE-031 within the preset time period is 3. For another example, when the downlink control information includes the user equipment-specific downlink control information, the amount indicated by the amount indication information is 3, and when the user equipment is the UE-031 in the implementation environment shown in FIG. 2, the amount indication information is used to indicate that a maximum amount of user equipment-specific downlink control information for the UE-031 within the preset time period is 3.

In this embodiment of the present disclosure, when the downlink control information includes the common downlink control information and the user equipment-specific downlink control information, the amount indication information in this embodiment of the present disclosure may include the following two possible implementation solutions:

(1). The amount indication information is used to indicate a maximum amount of common downlink control information and a maximum amount of user equipment-specific downlink control information. Specifically, the amount indication information is used to indicate a maximum amount of common downlink control information for the same user equipment within the preset time period and a maximum amount of user equipment-specific downlink control information for the same user equipment within the preset time period. For example, when the amount indicated by the amount indication information is 3 and the user equipment is the UE-031 in the implementation environment shown in FIG. 2, the amount indication information is used to indicate that both a maximum amount of common downlink control information for the UE-031 within the preset time period and a maximum amount of user equipment-specific downlink control information for the UE-031 within the preset time period are 3.

(2). The amount indication information is used to indicate a sum of a maximum amount of common downlink control information and a maximum amount of user equipment-specific downlink control information. Specifically, the amount indication information is used to indicate a sum of a maximum amount of common downlink control information for the same user equipment within the preset time period and a maximum amount of user equipment-specific downlink control information for the same user equipment within the preset time period. For example, when the amount indicated by the amount indication information is 3 and the user equipment is the UE-031 in the implementation environment shown in FIG. 2, the amount indication information is used to indicate that a sum of a maximum amount of common downlink control information for the UE-031 within the preset time period and a maximum amount of user equipment-specific downlink control information for the UE-031 within the preset time period is 3.

It should be noted that when the downlink control information includes the common downlink control information and the user equipment-specific downlink control information, the two solutions indicated by the amount indication information are merely examples. During actual application, another solution may be alternatively set according to a requirement. For example, the amount indication information may include common indication information and specific indication information, the common indication information is used to indicate a maximum amount of common downlink control information, and the specific indication information is used to indicate a maximum amount of user equipment-specific downlink control information. For example, the amount indication information and the maximum amount indicated by the amount indication information may be shown in Table 1.

TABLE 1

| Amount indication information | Maximum amount |
|---|---|
| Common amount indication information | 1 |
| Specific amount indication information | 2 |

Referring to Table 1, the amount indication information includes the common amount indication information and the specific amount indication information, the maximum amount indicated by the common amount indication information is 1, indicating that a maximum amount of common downlink control information for the same user equipment (for example, the UE-031) within the preset time period is 1; and the maximum amount indicated by the specific amount indication information is 2, indicating that a maximum amount of user equipment-specific downlink control information for the same user equipment (for example, the UE-031) within the preset time period is 2.

It should be further noted that in this embodiment of the present disclosure, a network controller may manage the base station, and interact with each base station managed by the network controller, to determine user equipment scheduled by each base station; and then collect statistics on and predict a maximum quantity of base stations scheduling each user equipment within a preset time period, and send the maximum quantity to any base station, so that the base station can generate amount indication information based on the received maximum quantity, and send the corresponding amount indication information to the user equipment. The implementation environment shown in FIG. 2 is used as an example for description. The network controller 01 may interact with each of the base station 021, the base station 022, and the base station 023 to determine UE scheduled by each base station; and then collect statistics on and predict a maximum quantity of base stations scheduling each UE within a preset time period, and send the maximum quantity to any base station. For example, the network controller 01 collects statistics on and predicts a maximum quantity of base stations scheduling the UE-032 within a preset time period, and sends the maximum quantity to the base station 021, so that the base station 021 generates amount indication information based on the maximum quantity. When sending the maximum quantity to the base station, the network controller may also send information related to the corresponding user equipment to the base station, so that the base station can send the amount indication information to the corresponding user equipment. For example, when sending the maximum quantity to the base station 021, the network controller 01 may also send information related to the UE-032 to the base station 021, so that the base station 021 can send the corresponding amount indication information to the UE-032 based on the information related to the UE-032.

It should be further noted that when the amount indication information is the amount indication information shown in Table 1, when sending the maximum quantity to the base station, the network controller may send the maximum amount of common downlink control information and the maximum amount of user equipment-specific downlink control information to the base station, so that the base station can generate the amount indication information shown in Table 1. This is not limited in this embodiment of the present disclosure.

Block 302: The base station sends the amount indication information to user equipment.

After generating the amount indication information, the base station may send the amount indication information to the user equipment. Optionally, the base station may send the amount indication information to the user equipment by using link layer signaling, and the link layer signaling may include data link layer signaling or radio link layer signaling. The data link layer signaling may be L2 signaling, and is also referred to as media access control (Media Access Control, MAC) layer signaling. The radio link layer signaling may be L3 signaling, and is also referred to as RRC signaling. Optionally, the base station adds the amount indication information to the link layer signaling, and sends the link layer signaling to the user equipment, to send the amount indication information.

For example, block 302 is described still by using the example in which the base station is the base station 021 in the implementation environment shown in FIG. 2 and the user equipment is the UE-031 in the implementation environment shown in FIG. 2. In this case, the base station 021 may send the amount indication information to the UE-031 by using link layer signaling.

It should be noted that duration of one scheduling period is usually a transmission time interval (Transmission Time Interval, TTI). The duration of one scheduling period is relatively short, and therefore information exchanged between the base station and the user equipment is likely to be invalid. In this embodiment of the present disclosure, the base station sends the amount indication information to the user equipment by using the data link layer signaling or the radio link layer signaling. Because both update periods of the data link layer signaling and the radio link layer signaling are relatively long and are usually greater than one scheduling period, when the base station sends the amount indication information to the user equipment by using the data link layer signaling or the radio link layer signaling, the information exchanged between the base station and the user equipment can be prevented from being invalid, thereby ensuring effectiveness of the exchanged information.

Block 303: The user equipment receives the amount indication information sent by the base station.

When the base station sends the amount indication information to the user equipment, the user equipment may receive the amount indication information sent by the base station. The amount indication information is used to indicate the maximum amount of downlink control information, and may specifically indicate a maximum amount of downlink control information for the user equipment (an execution body of block 303) within the preset time period. For detailed descriptions of the amount indication information, refer to block 301. Details are not described herein again in this embodiment of the present disclosure.

Optionally, corresponding to block 302, the user equipment may receive the amount indication information sent by the base station by using the link layer signaling, and the link layer signaling may include the data link layer signaling or the radio link layer signaling. The data link layer signaling may be L2 signaling, and is also referred to as MAC layer signaling. The radio link layer signaling may be L3 signaling, and is also referred to as RRC signaling. Optionally, the user equipment receives the link layer signaling sent by the base station, and parses the link layer signaling to obtain the amount indication information. For example, corresponding to block 302, the UE-031 may receive the amount indication information sent by the base station 021 by using the link layer signaling.

Block 304: The user equipment receives downlink control information based on the amount indication information.

After receiving the amount indication information, the user equipment may receive the downlink control information based on the amount indication information. Optionally, the downlink control information is usually carried in a PDCCH. Therefore, that the user equipment receives downlink control information based on the amount indication information may include that the user equipment performs blind detection on the PDCCH based on the amount indication information. It should be noted that the downlink control information in block 304 may include but is not limited to the downlink control information sent by the base station in block 302, and the downlink control information may come from at least one base station. For example, the downlink control information in block 304 may include downlink control information sent by the base station 021, the base station 022, and the base station 023 in the implementation environment shown in FIG. 2. Block 304 is described by using an example in which the user equipment is the UE-031 in the implementation environment shown in FIG. 2.

Optionally, in this embodiment of the present disclosure, the downlink control information includes at least one type of common downlink control information and user equipment-specific downlink control information. The common downlink control information is usually carried in common search space in a PDCCH, and may be system information, system information update information, paging information, and the like. The user equipment-specific downlink control information is usually carried in user equipment-specific search space in the PDCCH, and is usually related user equipment-specific scheduling information.

In this embodiment of the present disclosure, when the downlink control information includes either one type of the common downlink control information and the user equipment-specific downlink control information, the amount indication information is used to indicate a maximum amount of the one type of downlink control information, and is specifically used to indicate a maximum amount of the one type of downlink control information for the user equipment (an execution body of block 304) within the preset time period, and the user equipment may perform, based on the quantity indication information, blind detection on search space in which the one type of downlink control information is located in the PDCCH, to receive the corresponding downlink control information. For example, when the downlink control information includes the common downlink control information, the amount indicated by the amount indication information is 3, and the user equipment is the UE-031 in the implementation environment shown in FIG. 2, the amount indication information is used to indicate that a maximum amount of common downlink control information for the UE-031 within the preset time period is 3, and the UE-031 may perform blind detection on the common search space in the PDCCH based on the amount indication information. The UE-031 does not stop the blind detection until three pieces of common downlink control information are blindly detected. Alternatively, if an amount of common downlink control information blindly detected by the UE-031 is always less than 3 in a blind detection process, the UE-031 stops the blind detection after the UE-031 performs blind detection on all CCEs in the common search space in the PDCCH. For another example, when the downlink control information includes the user equipment-specific downlink control information, the amount indicated by the amount indication information is 3, and the user equipment is the UE-031 in the implementation environment shown in FIG. 2, the amount indication information is used to indicate that a maximum amount of user equipment-specific downlink control information for the UE-031 within the preset time period is 3, and the UE-031 may perform blind detection on the user equipment-specific search space in the PDCCH based on the amount indication information. The UE-031 does not stop the blind detection until three pieces of user equipment-specific downlink control information are blindly detected. Alternatively, if an amount of user equipment-specific downlink control information blindly detected by the UE-031 is always less than 3 in a blind detection process, the UE-031 stops the blind detection after the UE-031 performs blind detection on all CCEs in the user equipment-specific search space in the PDCCH.

In this embodiment of the present disclosure, when the downlink control information includes the common downlink control information and the user equipment-specific downlink control information, two possible implementation solutions included in the amount indication information in this embodiment of the present disclosure may be the same as those described in block 301. For the two possible implementation solutions, that the user equipment receives downlink control information based on the amount indication information may include the following two possible implementation solutions:

(1). The amount indication information is used to indicate a maximum amount of common downlink control information and a maximum amount of user equipment-specific downlink control information. Specifically, the amount indication information is used to indicate a maximum amount of common downlink control information for the same user equipment within the preset time period and a maximum amount of user equipment-specific downlink control information for the same user equipment within the preset time period. The user equipment may first perform blind detection on the common search space in the PDCCH based on the amount indication information, to receive common downlink control information, and then perform blind detection on the user equipment-specific search space in the PDCCH based on the amount indication information, to receive user equipment-specific downlink control information. The possible implementation solution (1) may include the following four cases:

1A). In a process in which the user equipment performs blind detection on the common search space in the PDCCH, when an amount of common downlink control information blindly detected by the user equipment reaches the amount indicated by the amount indication information, the user equipment stops the blind detection on the common search space in the PDCCH, and performs blind detection on the user equipment-specific search space in the PDCCH. When an amount of user equipment-specific downlink control information blindly detected by the user equipment reaches the amount indicated by the amount indication information, the user equipment stops the blind detection on the user equipment-specific search space in the PDCCH. For example, when the amount indicated by the amount indication information is 3 and the user equipment is the UE-031 in the implementation environment shown in FIG. 2, the UE-031 may first perform blind detection on the common search space in the PDCCH, and when the UE-031 blindly detects three pieces of common downlink control information, the UE-031 stops the blind detection on the common search space in the PDCCH, and performs blind detection on the user equipment-specific search space in the PDCCH. When the UE-031 blindly detects three pieces of user equipment-specific downlink control information, the UE-031 stops the blind detection on the user equipment-specific search space in the PDCCH.

1B). In a process in which the user equipment performs blind detection on the common search space in the PDCCH, if an amount of common downlink control information blindly detected by the user equipment is always less than the amount indicated by the amount indication information, after the user equipment performs blind detection on all CCEs in the common search space in the PDCCH, the user equipment stops the blind detection on the common search space in the PDCCH, and performs blind detection on the user equipment-specific search space in the PDCCH. If an amount of user equipment-specific downlink control information blindly detected by the user equipment is always less than the amount indicated by the amount indication information, after the user equipment performs blind detection on all CCEs in the user equipment-specific search space in the PDCCH, the user equipment stops the blind detection on the user equipment-specific search space in the PDCCH. For example, when the amount indicated by the amount indication information is 3 and the user equipment is the UE-031 in the implementation environment shown in FIG. 2, the UE-031 may first perform blind detection on the common search space in the PDCCH, and if an amount of common downlink control information blindly detected by the UE-031 is always less than 3, after the UE-031 performs blind detection on all the CCEs in the common search space in the PDCCH, the UE-031 stops the blind detection on the common search space in the PDCCH, and performs blind detection on the user equipment-specific search space in the PDCCH. If an amount of user equipment-specific downlink control information blindly detected by the UE-031 is always less than 3, after the UE-031 performs blind detection on all the CCEs in the user equipment-specific search space in the PDCCH, the UE-031 stops the blind detection on the user equipment-specific search space in the PDCCH.

1C). In a process in which the user equipment performs blind detection on the common search space in the PDCCH, when an amount of common downlink control information blindly detected by the user equipment reaches the amount indicated by the amount indication information, the user equipment stops the blind detection on the common search space in the PDCCH, and performs blind detection on the user equipment-specific search space in the PDCCH. If an amount of user equipment-specific downlink control information blindly detected by the user equipment is always less than the amount indicated by the amount indication information, after the user equipment performs blind detection on all CCEs in the user equipment-specific search space in the PDCCH, the user equipment stops the blind detection on the user equipment-specific search space in the PDCCH. For example, when the amount indicated by the amount indication information is 3 and the user equipment is the UE-031 in the implementation environment shown in FIG. 2, the UE-031 may first perform blind detection on the common search space in the PDCCH, and when the UE-031 blindly detects three pieces of common downlink control information, the UE-031 stops the blind detection on the common search space in the PDCCH, and performs blind detection on the user equipment-specific search space in the PDCCH. If an amount of user equipment-specific downlink control information blindly detected by the UE-031 is always less than 3, after the UE-031 performs blind detection on all the CCEs in the user equipment-specific search space in the PDCCH, the UE-031 stops the blind detection on the user equipment-specific search space in the PDCCH.

1D). In a process in which the user equipment performs blind detection on the common search space in the PDCCH, if an amount of common downlink control information blindly detected by the user equipment is always less than the amount indicated by the amount indication information, after the user equipment performs blind detection on all CCEs in the common search space in the PDCCH, the user equipment stops the blind detection on the common search space in the PDCCH, and performs blind detection on the user equipment-specific search space in the PDCCH. When an amount of user equipment-specific downlink control information blindly detected by the user equipment reaches the amount indicated by the amount indication information, the user equipment stops the blind detection on the user equipment-specific search space in the PDCCH. For example, when the amount indicated by the amount indication information is 3 and the user equipment is the UE-031 in the implementation environment shown in FIG. 2, the UE-031 may first perform blind detection on the common search space in the PDCCH, and if an amount of common downlink control information blindly detected by the UE-031 is always less than 3, after the UE-031 performs blind detection on all the CCEs in the common search space in the PDCCH, the UE-031 stops the blind detection on the common search space in the PDCCH, and performs blind detection on the user equipment-specific search space in the PDCCH. When the UE-031 blindly detects three pieces of user equipment-specific downlink control information, the UE-031 stops the blind detection on the user equipment-specific search space in the PDCCH.

(2). The amount indication information is used to indicate a sum of a maximum amount of common downlink control information and a maximum amount of user equipment-specific downlink control information. Specifically, the amount indication information is used to indicate a sum of a maximum amount of common downlink control information for the same user equipment within the preset time period and a maximum amount of user equipment-specific downlink control information for the same user equipment within the preset time period. The user equipment may first perform blind detection on the common search space in the PDCCH based on the amount indication information, to receive common downlink control information, and then perform blind detection on the user equipment-specific search space in the PDCCH based on the amount indication information, to receive user equipment-specific downlink control information. The possible implementation solution (2) may include the following three cases:

2A). In a process in which the user equipment performs blind detection on the common search space in the PDCCH, if an amount of common downlink control information blindly detected by the user equipment is always less than the amount indicated by the amount indication information, after the user equipment performs blind detection on all CCEs in the common search space in the PDCCH, the user equipment stops the blind detection on the common search space in the PDCCH, and performs blind detection on the user equipment-specific search space in the PDCCH. When a sum of an amount of user equipment-specific downlink control information blindly detected by the user equipment and the amount of common downlink control information blindly detected by the user equipment is equal to the amount indicated by the amount indication information, the user equipment stops the blind detection on the user equipment-specific search space in the PDCCH. For example, when the amount indicated by the amount indication information is 3 and the user equipment is the UE-031 in the implementation environment shown in FIG. 2, the UE-031 may first perform blind detection on the common search space in the PDCCH, and if an amount of common downlink control information blindly detected by the UE-031 is always less than 3 (for example, the UE-031 blindly detects zero pieces, one piece, or two pieces of common downlink control information), after the UE-031 performs blind detection on all the CCEs in the common search space in the PDCCH, the UE-031 stops the blind detection on the common search space in the PDCCH, and performs blind detection on the user equipment-specific search space in the PDCCH. When a sum of an amount of user equipment-specific downlink control information blindly detected by the UE-031 (for example, the UE blindly detects three pieces, two pieces, or one piece of user equipment-specific downlink control information) and the amount of common downlink control information blindly detected by the UE-031 is equal to the amount indicated by the amount indication information, the UE-031 stops the blind detection on the user equipment-specific search space in the PDCCH.

2B). In a process in which the user equipment performs blind detection on the common search space in the PDCCH, if an amount of common downlink control information blindly detected by the user equipment is always less than the amount indicated by the amount indication information, after the user equipment performs blind detection on all CCEs in the common search space in the PDCCH, the user equipment stops the blind detection on the common search space in the PDCCH, and performs blind detection on the user equipment-specific search space in the PDCCH. If in a process of performing blind detection on the user equipment-specific search space in the PDCCH, a sum of an amount of user equipment-specific downlink control information blindly detected by the user equipment and the amount of common downlink control information blindly detected by the user equipment is always less than the amount indicated by the amount indication information, after performing blind detection on all CCEs in the user equipment-specific search space in the PDCCH, the user equipment stops the blind detection on the user equipment-specific search space in the PDCCH. For example, when the amount indicated by the amount indication information is 3 and the user equipment is the UE-031 in the implementation environment shown in FIG. 2, the UE-031 may first perform blind detection on the common search space in the PDCCH, and if an amount of common downlink control information blindly detected by the UE-031 is always less than 3 (for example, the UE-031 blindly detects zero pieces, one piece, or two pieces of common downlink control information), after the UE-031 performs blind detection on all the CCEs in the common search space in the PDCCH, the UE-031 stops the blind detection on the common search space in the PDCCH, and performs blind detection on the user equipment-specific search space in the PDCCH. If in a process of performing blind detection on the user equipment-specific search space in the PDCCH, a sum of an amount of user equipment-specific downlink control information blindly detected by the UE-031 and the amount of common downlink control information blindly detected by the UE-031 is always less than 3, after performing blind detection on all the CCEs in the user equipment-specific search space in the PDCCH, the UE-031 stops the blind detection on the user equipment-specific search space in the PDCCH.

2C). In a process in which the user equipment performs blind detection on the common search space in the PDCCH, when an amount of common downlink control information blindly detected by the user equipment reaches the amount indicated by the amount indication information, the user equipment stops the blind detection on the common search space in the PDCCH, and does not perform blind detection on the user equipment-specific search space in the PDCCH. For example, when the amount indicated by the amount indication information is 3 and the user equipment is the UE-031 in the implementation environment shown in FIG. 2, the UE-031 may first perform blind detection on the common search space in the PDCCH, and when the UE-031 blindly detects three pieces of common downlink control information, the UE-031 stops the blind detection on the common search space in the PDCCH, and does not perform blind detection on the user equipment-specific search space in the PDCCH.

Optionally, in this embodiment of the present disclosure, the PDCCH may include a plurality of control channel areas, the plurality of control channels may be located on different sub-bands, and the user equipment may simultaneously listen on the plurality of control channel areas. In this case, when performing blind detection on the PDCCH, the user equipment may perform blind detection on the plurality of control channel areas in series or in parallel. Optionally, the user equipment may first determine a computing capability of the user equipment; and when the computing capability of the user equipment is relatively strong, the user equipment may perform blind detection on the plurality of control channel areas in parallel; or when the computing capability of the user equipment is relatively weak, the user equipment may perform blind detection on the plurality of control channel areas in series. It should be noted that each control channel area may include a plurality of CCEs, and when performing blind detection on the plurality of control channel areas in parallel, the user equipment performs blind detection on the CCEs in each control channel area in series. This is not limited in this embodiment of the present disclosure.

Figure 4:
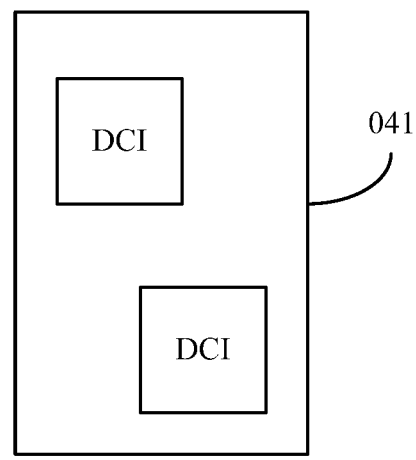
FIG. 4 is a schematic diagram of one type of distribution of downlink control information according to an embodiment of the present disclosure.
Figure 5:
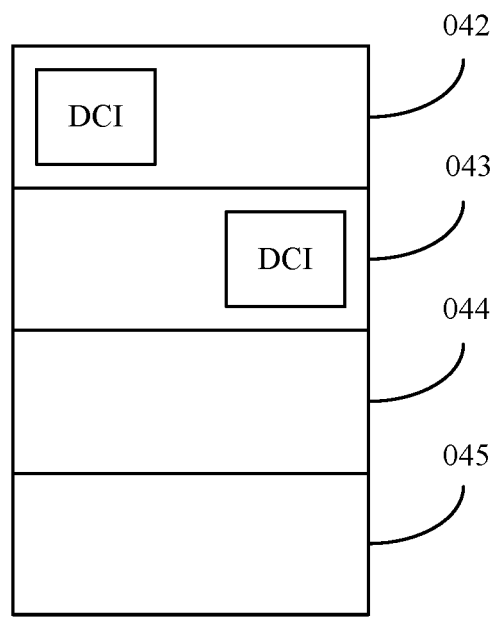
FIG. 5 is a schematic diagram of another type of distribution of downlink control information according to an embodiment of the present disclosure.

Optionally, in this embodiment of the present disclosure, the PDCCH includes a plurality of control channel areas, and the plurality of control channel areas usually may be obtained through frequency-based division, so that the plurality of control channels may be located on different sub-bands. A plurality of pieces of downlink control information for same user equipment may be located in a same control channel area, or may be located in different control channel areas. In other words, a plurality of pieces of downlink control information for same user equipment may be located in a same sub-band, or may be located in different sub-bands. For example, FIG. 4 is a schematic diagram of one type of distribution of downlink control information according to an embodiment of the present disclosure. Referring to FIG. 4, a PDCCH (not shown in FIG. 4) includes a control channel area 041. The control channel area 041 may be located on a sub-band, and two pieces of downlink control information for same user equipment (for example, the UE-031) are located in the control channel area 041. The UE-031 may perform blind detection on the control channel area 041 in FIG. 4 based on an amount that is of downlink control information and that is indicated by amount indication information, to receive the two pieces of downlink control information, and when the UE-031 blindly detects two pieces of downlink control information, the UE-031 stops the blind detection. For example, FIG. 5 is a schematic diagram of another type of distribution of downlink control information according to an embodiment of the present disclosure. Referring to FIG. 5, a PDCCH (not shown in FIG. 5) includes a control channel area 042, a control channel area 043, a control channel area 044, and a control channel area 045. The control channel area 042, the control channel area 043, the control channel area 044, and the control channel area 045 are located on different sub-bands, and two pieces of downlink control information for same user equipment (for example, the UE-031) are separately located in the control channel area 042 and the control channel area 043. Assuming that the UE-031 simultaneously listens on the control channel area 042, the control channel area 043, the control channel area 044, and the control channel area 045, when performing blind detection on the PDCCH, the UE-031 may sequentially perform blind detection on the control channel area 042, the control channel area 043, the control channel area 044, and the control channel area 045 in series, or may simultaneously perform blind detection on the control channel area 042, the control channel area 043, the control channel area 044, and the control channel area 045 in parallel. This is not limited in this embodiment of the present disclosure. For example, the UE-031 sequentially performs blind detection on the control channel area 042, the control channel area 043, the control channel area 044, and the control channel area 045 in series, and when the UE-031 blindly detects two pieces of downlink control information, the UE-031 stops the blind detection, and does not perform blind detection on the other control channel areas. As shown in FIG. 5, when the UE-031 blindly detects downlink control information in the control channel area 043, the UE-031 stops the blind detection, and does not perform blind detection on the control channel area 044 and the control channel area 045. For another example, the UE-031 simultaneously performs blind detection on the control channel area 042, the control channel area 043, the control channel area 044, and the control channel area 045 in parallel, and when the UE-031 blindly detects two pieces of downlink control information, the UE-031 stops the blind detection, and does not perform blind detection on all the control channel areas again. It should be noted that FIG. 4 and FIG. 5 are described by using an example in which the downlink control information is LTE DCI. A person skilled in the art should understand that in a 5G communications system, the downlink control information may alternatively be other downlink control information, and FIG. 4 and FIG. 5 shall not be understood as limitations on the solution of this embodiment of the present disclosure.

It should be noted that, in this embodiment of the present disclosure, the amount indication information may have a default value. When the user equipment receives the amount indication information, the user equipment receives the downlink control information based on the maximum amount that is of downlink control information and that is indicated by the received amount indication information; or when the user equipment receives no amount indication information, the user equipment may receive the downlink control information based on the default value of the amount indication information. Optionally, in this embodiment of the present disclosure, the default value of the amount indication information may be 1. To be specific, when the user equipment receives no amount indication information, the user equipment considers, by default, that the maximum amount of downlink control information is 1, and the user equipment stops blind detection when blindly detecting one piece of downlink control information.

It should be further noted that this embodiment of the present disclosure is described by using an example in which the user equipment first performs blind detection on the common search space in the PDCCH and then performs blind detection on the user equipment-specific search space in the PDCCH. During actual application, the user equipment may alternatively perform blind detection on the common search space and the user equipment-specific search space in the PDCCH in another sequence or according to another blind detection method. A blind detection method and a blind detection sequence of the user equipment are not limited in this embodiment of the present disclosure.

According to the information transmission method provided in this embodiment of the present disclosure, the user equipment can perform blind detection on the PDCCH based on the amount indication information sent by the base station, to receive the downlink control information, and the user equipment stops the blind detection when an amount of downlink control information blindly detected by the user equipment reaches the amount indicated by the amount indication information. According to this solution, this embodiment of the present disclosure can avoid a case in which some downlink control information is neglected in the blind detection, and also can resolve a problem that complexity of the blind detection is relatively high because the user equipment should perform blind detection on all CCEs in the PDCCH. In addition, in this embodiment of the present disclosure, a coordinated base station may not need to send scheduling information to a serving base station, and therefore information exchanged between the base station and the user equipment can be prevented from being expired due to a relatively long transmission latency of a backhaul link.

In conclusion, according to the information transmission method provided in this embodiment of the present disclosure, the base station generates the amount indication information and sends the amount indication information to the user equipment, where the amount indication information is used to indicate the maximum amount of downlink control information, so that the user equipment receives the downlink control information based on the amount indication information. This can resolve a problem that complexity of blind detection performed by the user equipment is relatively high, thereby reducing the complexity of the blind detection performed by the user equipment.

According to the information transmission method provided in this embodiment of the present disclosure, the base station sends the amount indication information to the user equipment, so that the user equipment optimizes a blind detection process based on the amount indication information. In this way, a quantity of times of blind detection is reduced, and complexity of the user equipment is reduced.

The information transmission method provided in this embodiment of the present disclosure can support switching between different transmission solutions, and can further support switching between scenarios in which there are different quantities of base stations in a same transmission solution. For details, refer to embodiments shown in FIG. 6 to FIG. 8.

Figure 6:
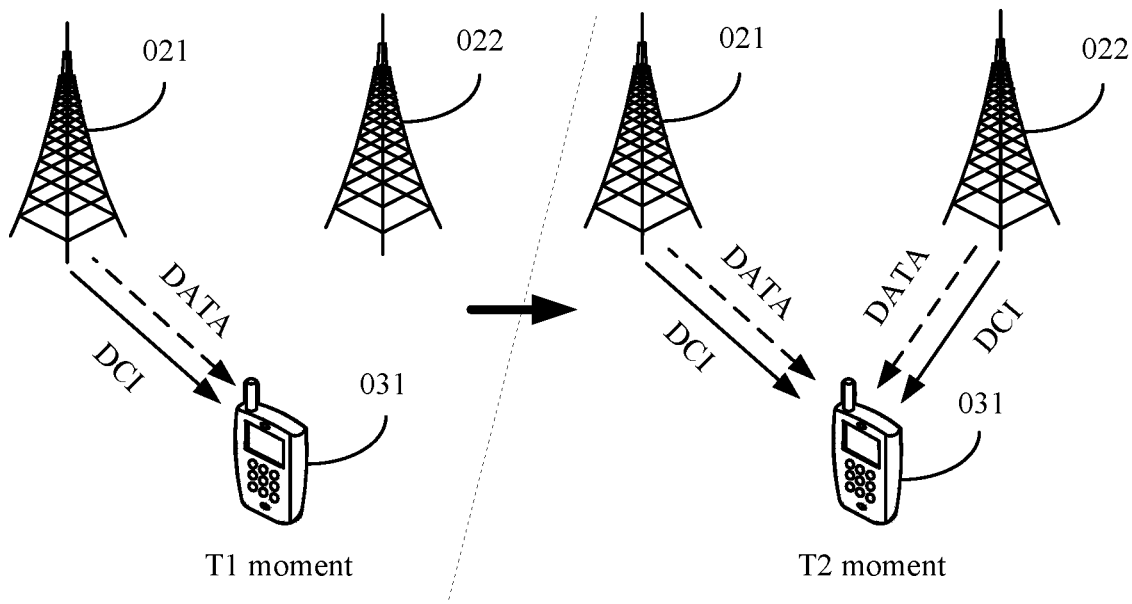
FIG. 6 is a schematic diagram of one type of switching between transmission solutions according to an embodiment of the present disclosure.

FIG. 6 is a schematic diagram of one type of switching between transmission solutions according to an embodiment of the present disclosure. Referring to FIG. 6, at a T1 moment, a base station 021 schedules UE-031 and a base station 022 does not schedule the UE-031, an amount of downlink control information for the UE-031 is 1, and a transmission solution corresponding to the T1 moment may be a single-base station (or single-TRP) transmission solution; at a T2 moment, both the base station 021 and the base station 022 schedule the UE-031, an amount of downlink control information for the UE-031 is 2, and a transmission solution corresponding to the T2 moment may be a multi-base station (or multi-TRP) transmission solution. The amount of downlink control information varies with a quantity of base stations scheduling the UE-031 at the T1 moment.

In this embodiment of the present disclosure, a network controller (not shown in FIG. 6) may interact with the base station 021 and the base station 022; and collect statistics on and predict a maximum quantity of base stations scheduling the UE-031 within a preset time period (the preset time period includes the T1 moment and the T2 moment), and then send the maximum quantity to the base station 021 (or the base station 022). After receiving the maximum quantity, the base station 021 generates amount indication information based on the maximum quantity, and sends the amount indication information to the UE-031 by using link layer signaling (for example, L2 signaling or L3 signaling), so that the UE-031 performs blind detection on a PDCCH based on the amount indication information. The amount indication information is used to indicate a maximum amount of downlink control information for the UE-031 within the preset time period, and the downlink control information may be at least one type of common downlink control information and user equipment-specific downlink control information. This embodiment is described by using an example in which the downlink control information is the user equipment-specific downlink control information. When the downlink control information is LTE DCI, the maximum amount of downlink control information may be indicated by MAX_DCI_NUM. In the embodiment shown in FIG. 6, MAX_DCI_NUM=2, indicating that an amount of user equipment-specific downlink control information is 2. Because MAX_DCI_NUM=2, at the T1 moment, after blindly detecting one piece of user equipment-specific downlink control information, the UE-031 continues the blind detection until blind detection is performed on all possible CCEs in the PDCCH; and at the T2 moment, the UE-031 stops the blind detection when blindly detecting two pieces of user equipment-specific downlink control information.

In addition, in the embodiment shown in FIG. 6, the transmission solution corresponding to the T1 moment is the single-base station transmission solution, and the transmission solution corresponding to the T2 moment is the multi-base station transmission solution. Because the transmission solution changes, the information transmission method provided in this embodiment of the present disclosure supports switching between the single-base station transmission solution and the multi-base station transmission solution.

Figure 7:
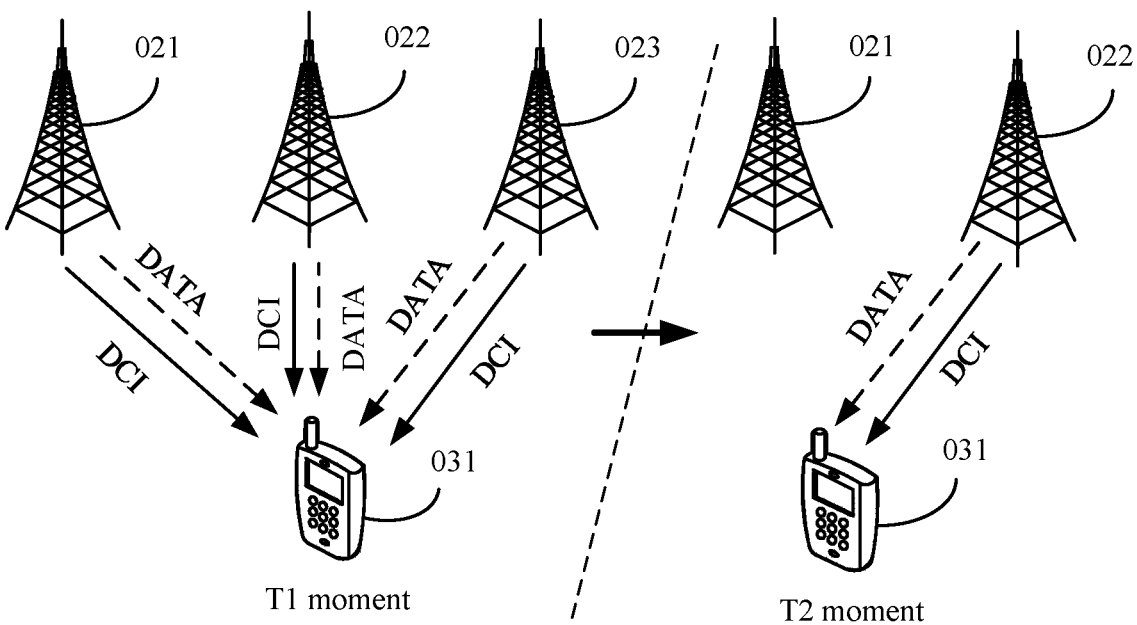
FIG. 7 is a schematic diagram of another type of switching between transmission solutions according to an embodiment of the present disclosure.

FIG. 7 is a schematic diagram of another type of switching between transmission solutions according to an embodiment of the present disclosure. Referring to FIG. 7, at a T1 moment, a base station 021, a base station 022, and a base station 023 schedule UE-031 by using a non-coherent joint transmission (Non-coherent Joint Transmission, NC-JT) solution, and an amount of downlink control information for the UE-031 may be 3; at a T2 moment, the base station 022 schedules the UE-031 by using a coordinated scheduling/coordinated beamforming (Coordinated Scheduling/Coordinated Beamforming, CS/CB) solution or a dynamic point selection (Dynamic Point Selection, DPS) solution and the base station 021 does not schedule the UE-031, and an amount of downlink control information for the UE-031 may be 1. Therefore, it can be learned that from the T1 moment to the T2 moment, the amount of downlink control information for the UE-031 also changes, and the amount of downlink control information changes from 3 at the T1 moment to 1 at the T2 moment.

In this embodiment of the present disclosure, a network controller (not shown in FIG. 7) may interact with the base station 021, the base station 022, and the base station 023; and collect statistics on and predict a maximum quantity of base stations scheduling the UE-031 within a preset time period (the preset time period includes the T1 moment and the T2 moment), and then send the maximum quantity to the base station 022 (or the base station 021 or the base station 023). After receiving the maximum quantity, the base station 022 generates amount indication information based on the maximum quantity, and sends the amount indication information to the UE-031 by using link layer signaling (for example, L2 signaling or L3 signaling), so that the UE-031 performs blind detection on a PDCCH based on the amount indication information. The amount indication information is used to indicate a maximum amount of downlink control information for the UE-031 within the preset time period, and the downlink control information may be at least one type of common downlink control information and user equipment-specific downlink control information. This embodiment is described by using an example in which the downlink control information is the user equipment-specific downlink control information. When the downlink control information is LTE DCI, the maximum amount of downlink control information may be indicated by MAX_DCI_NUM. In the embodiment shown in FIG. 7, MAX_DCI_NUM=3, indicating that an amount of user equipment-specific downlink control information is 3. Because MAX_DCI_NUM=3, at the T1 moment, the UE-031 stops the blind detection when blindly detecting three pieces of user equipment-specific downlink control information; and at the T2 moment, the UE-031 performs blind detection on the PDCCH until blind detection is performed on all possible CCEs in the PDCCH.

In addition, in the embodiment shown in FIG. 7, a transmission solution corresponding to the T1 moment is the NC-JT solution, and a transmission solution corresponding to the T2 moment is the CS/CB solution or the DPS solution. All the NC-JT solution, the CS/CB solution, and the DPS solution are coordinated transmission solutions. Therefore, the information transmission method provided in this embodiment of the present disclosure supports switching between different coordinated transmission solutions.

Figure 8:
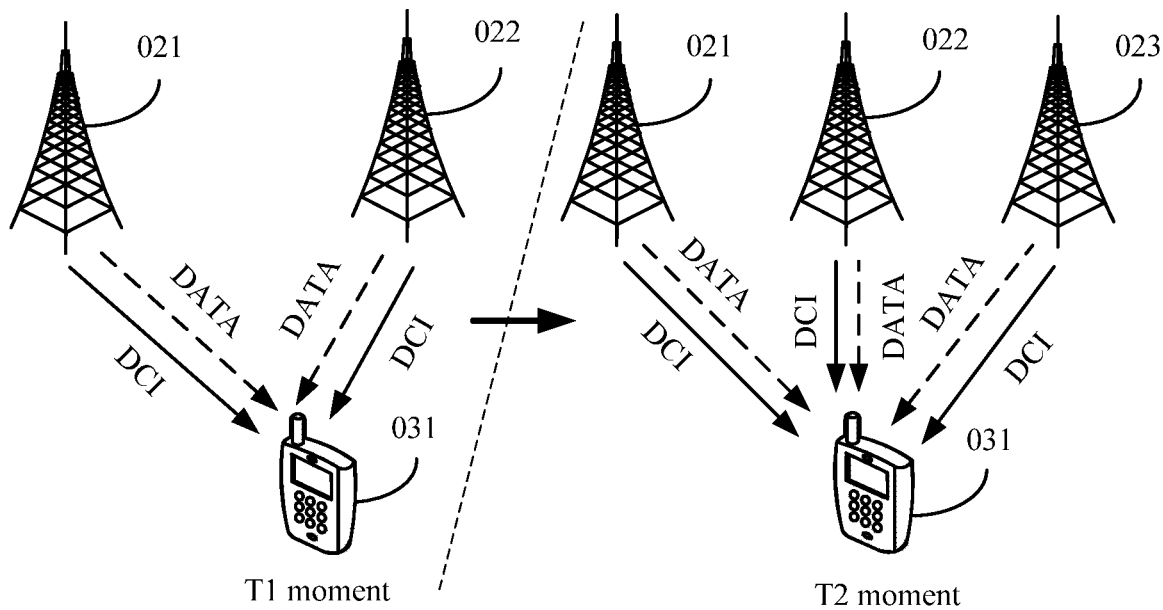
FIG. 8 is a schematic diagram of switching between scenarios in which there are different quantities of base stations in a same transmission solution according to an embodiment of the present disclosure.

FIG. 8 is a schematic diagram of switching between scenarios in which there are different quantities of base stations in a same transmission solution according to an embodiment of the present disclosure. Referring to FIG. 8, at a T1 moment, a base station 021 and a base station 022 schedule UE-031 by using an NC-JT solution, and an amount of downlink control information for the UE-031 may be 2; at a T2 moment, the base station 021, the base station 022, and a base station 023 schedule the UE-031 by using the NC-JT solution, and an amount of downlink control information for the UE-031 may be 3. Therefore, it can be learned that from the T1 moment to the T2 moment, the amount of downlink control information for the UE-031 also changes, and the amount of downlink control information changes from 2 at the T1 moment to 3 at the T2 moment.

In this embodiment of the present disclosure, a network controller (not shown in FIG. 8) may interact with the base station 021, the base station 022, and the base station 023; and collect statistics on and predict a maximum quantity of base stations scheduling the UE-031 within a preset time period (the preset time period includes the T1 moment and the T2 moment), and then send the maximum quantity to the base station 021 (or the base station 022 or the base station 023). After receiving the maximum quantity, the base station 021 generates amount indication information based on the maximum quantity, and sends the amount indication information to the UE-031 by using link layer signaling (for example, L2 signaling or L3 signaling), so that the UE-031 performs blind detection on a PDCCH based on the amount indication information. The amount indication information is used to indicate a maximum amount of downlink control information for the UE-031 within the preset time period, and the downlink control information may be at least one type of common downlink control information and user equipment-specific downlink control information. This embodiment is described by using an example in which the downlink control information is the user equipment-specific downlink control information. When the downlink control information is LTE DCI, the maximum amount of downlink control information may be indicated by MAX_DCI_NUM. In the embodiment shown in FIG. 8, MAX_DCI_NUM=3, indicating that an amount of user equipment-specific downlink control information is 3. Because MAX_DCI_NUM=3, at the T1 moment, the UE-031 performs blind detection on the PDCCH until blind detection is performed on all possible CCEs in the PDCCH; and at the T2 moment, the UE-031 stops the blind detection when blindly detecting three pieces of user equipment-specific downlink control information.

In addition, in the embodiment shown in FIG. 8, both a transmission solution corresponding to the T1 moment and a transmission solution corresponding to the T2 moment are the NC-JT solution, but a scenario at the T1 moment is a scenario in which two base stations simultaneously schedule the UE-031, and a scenario at the T2 moment is a scenario in which three base stations simultaneously schedule the UE-031. Therefore, the information transmission method provided in this embodiment of the present disclosure can support switching between scenarios in which there are different quantities of base stations in a same coordinated transmission solution.

It should be noted that in the embodiments shown in FIG. 6 to FIG. 8, if the base station sends no amount indication information to the UE-031, at both the T1 moment and the T2 moment, the UE-031 should perform blind detection on all the possible CCEs in the PDCCH. In this case, complexity of the blind detection is relatively high. In the embodiments of the present disclosure, the amount indication information is sent to the UE-031, so that complexity of the blind detection can be reduced.

In a future 5G communications system, with rapid development of mobile communications, there are higher requirements in many aspects such as a system capacity, an instantaneous peak rate, spectral efficiency, a cell-edge user throughput, and a latency. Currently, regardless of whether a CoMP/FeCoMP technology is used in uplink communication or downlink communication, system performance can be improved, and in particular, cell-edge spectral efficiency is improved. The information transmission method provided in the embodiments of the present disclosure is well applicable to CoMP/FeCoMP, and therefore can improve system performance and improve cell-edge spectral efficiency.

The following apparatus embodiments of this application may be used to execute the method embodiments of this application. For details not disclosed in the apparatus embodiments of this application, refer to the method embodiments of this application.

Figure 9:
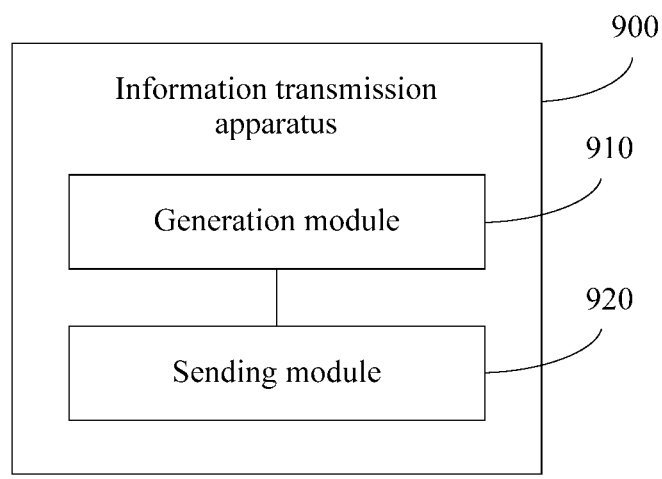
FIG. 9 is a block diagram of an information transmission apparatus according to an embodiment of the present disclosure.

FIG. 9 is a block diagram of an information transmission apparatus 900 according to an embodiment of the present disclosure. The information transmission apparatus 900 may be implemented as a part or all of a base station by using software, hardware, or a combination thereof. The base station may be any base station in the implementation environment shown in FIG. 2. Referring to FIG. 9, the information transmission apparatus 900 may include but is not limited to:

a generation module 910, configured to generate amount indication information, where the amount indication information is used to indicate a maximum amount of downlink control information; and a sending module 920, configured to send the amount indication information to user equipment.

Optionally, the sending module 920 is configured to send the amount indication information to the user equipment by using link layer signaling.

In conclusion, according to the information transmission apparatus provided in this embodiment of the present disclosure, the base station generates the amount indication information and sends the amount indication information to the user equipment, where the amount indication information is used to indicate the maximum amount of downlink control information, so that the user equipment receives downlink control information based on the amount indication information. This can resolve a problem that complexity of blind detection performed by the user equipment is relatively high, thereby reducing the complexity of the blind detection performed by the user equipment.

Figure 10:
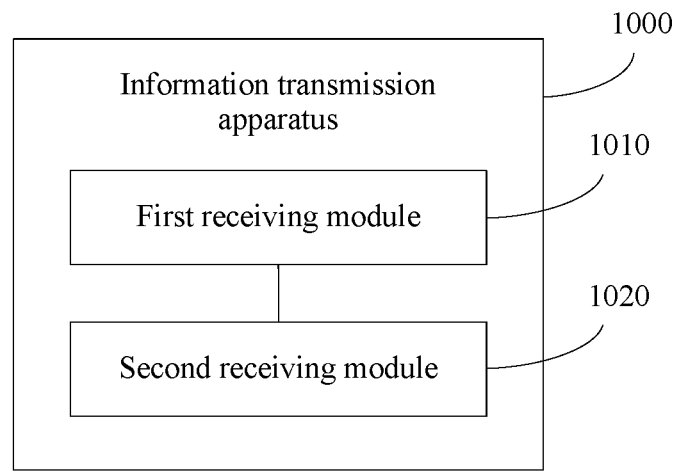
FIG. 10 is a block diagram of an information transmission apparatus according to an embodiment of the present disclosure.

FIG. 10 is a block diagram of an information transmission apparatus 1000 according to an embodiment of the present disclosure. The information transmission apparatus 1000 may be implemented as a part or all of user equipment by using software, hardware, or a combination thereof. The user equipment may be any user equipment (for example, the user equipment 031) in the implementation environment shown in FIG. 2. Referring to FIG. 10, the information transmission apparatus 1000 may include:

a first receiving module 1010, configured to receive amount indication information, where the amount indication information is used to indicate a maximum amount of downlink control information; and a second receiving module 1020, configured to receive downlink control information based on the amount indication information.

Optionally, the first receiving module 1010 is configured to receive the amount indication information sent by using link layer signaling.

In conclusion, according to the information transmission apparatus provided in this embodiment of the present disclosure, the user equipment receives the amount indication information, and receives the downlink control information based on the amount indication information, where the amount indication information is used to indicate the maximum amount of downlink control information. This can resolve a problem that complexity of blind detection performed by the user equipment is relatively high, thereby reducing the complexity of the blind detection performed by the user equipment.

It should be noted that merely the foregoing function module division is used as an example for description when the information transmission apparatuses provided in the foregoing embodiments transmit information. During actual application, the foregoing functions may be allocated to different function modules for implementation according to a requirement. To be specific, inner structures of the devices are divided into different function modules to implement all or some of the functions described above. In addition, the information transmission apparatuses provided in the foregoing embodiments belong to a same conception as the information transmission method embodiments. For a specific implementation process of the information transmission apparatuses, refer to the method embodiments. Details are not described herein again.

Figure 11:
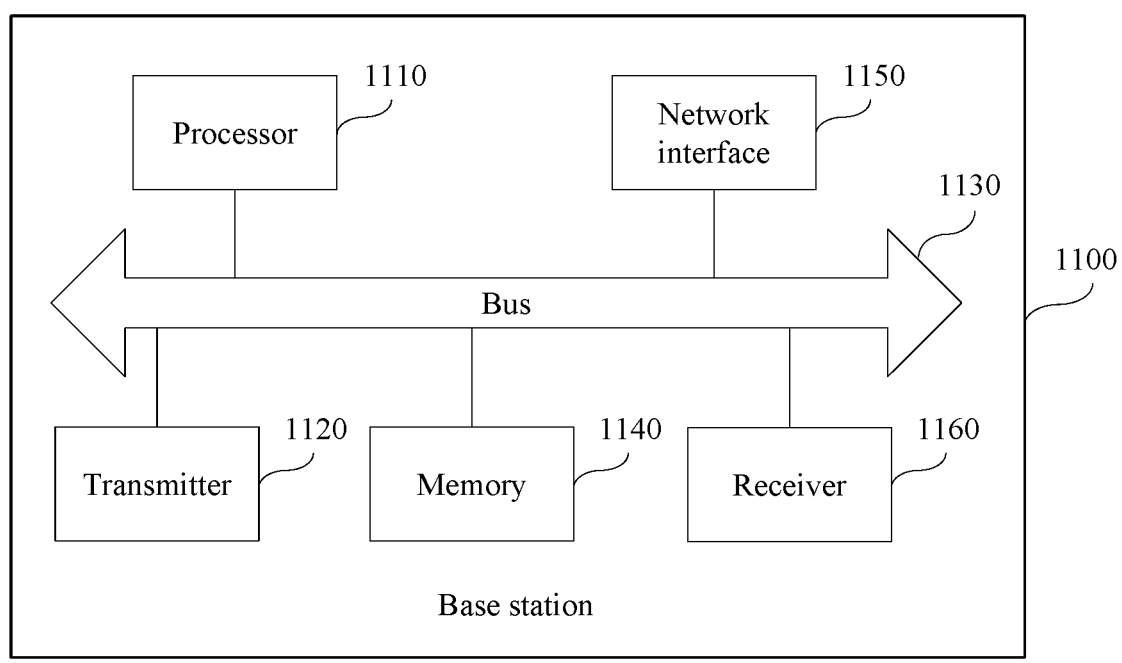
FIG. 11 is a schematic structural diagram of a base station according to an embodiment of the present disclosure.

FIG. 11 is a schematic structural diagram of a base station 1100 according to an embodiment of the present disclosure. The base station 1100 may be any base station in the implementation environment shown in FIG. 2, and is configured to perform a part of the method according to the embodiment shown in FIG. 3. Referring to FIG. 11, the base station 1100 includes a processor 1110 and a transmitter 1120, and the processor 1110 and the transmitter 1120 are connected by using a bus 1130.

The processor 1110 includes one or more processing cores. The processor 1110 implements various functional applications and data processing by running a software program and a unit.

Optionally, as shown in FIG. 11, the base station 1100 further includes a memory 1140, a network interface 1150, and a receiver 1160, and the memory 1140, the network interface 1150, and the receiver 1160 are all connected to the processor 1110 and the transmitter 1120 by using the bus 1130.

There may be a plurality of network interfaces 1150. The network interface 1150 is used by the base station 1100 to communicate with another storage device or network device. The network interface 1150 is optional. During actual application, the base station 1100 may communicate with another storage device or network device by using the transmitter 1120 and the receiver 1160. Therefore, the base station 1100 may have no network interface. This is not limited in this embodiment of the present disclosure.

The processor 1110 is configured to generate amount indication information, where the amount indication information is used to indicate a maximum amount of downlink control information.

The transmitter 1120 is configured to send the amount indication information to user equipment.

Optionally, the transmitter 1120 is configured to send the amount indication information to the user equipment by using link layer signaling.

In conclusion, the base station provided in this embodiment of the present disclosure generates the amount indication information and sends the amount indication information to the user equipment, where the amount indication information is used to indicate the maximum amount of downlink control information, so that the user equipment receives downlink control information based on the amount indication information. This can resolve a problem that complexity of blind detection performed by the user equipment is relatively high, thereby reducing the complexity of the blind detection performed by the user equipment.

Figure 12:
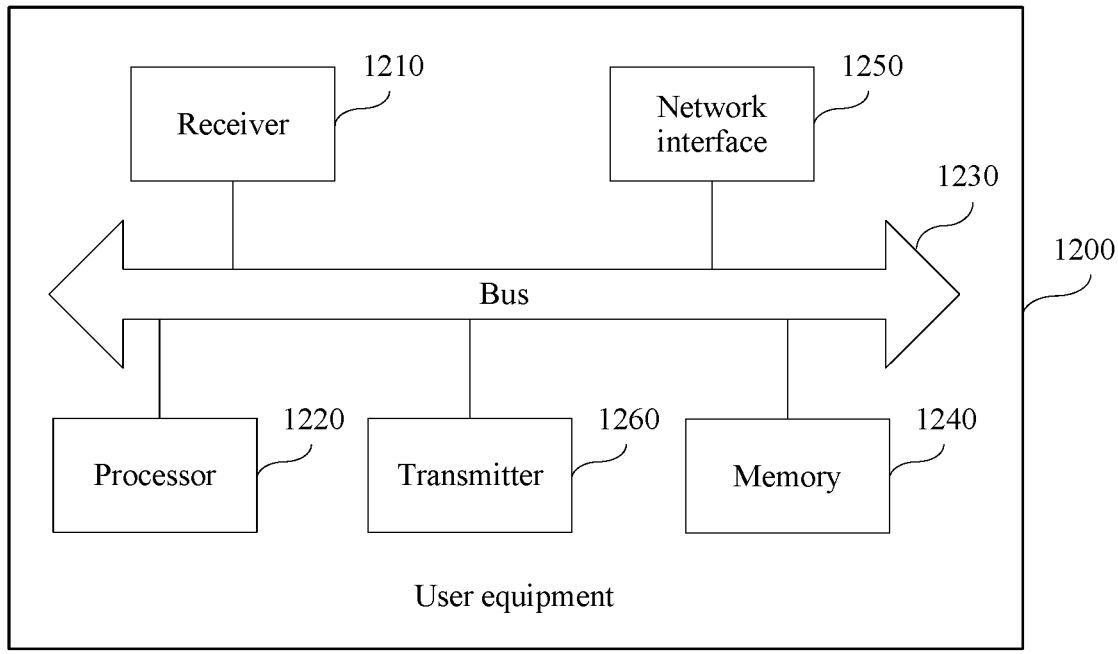
FIG. 12 is a schematic structural diagram of user equipment according to an embodiment of the present disclosure.

FIG. 12 is a schematic structural diagram of user equipment 1200 according to an embodiment of the present disclosure. The user equipment 1200 may be any user equipment (for example, the user equipment 031) in the implementation environment shown in FIG. 2, and is configured to perform a part of the method according to the embodiment shown in FIG. 3. Referring to FIG. 12, the user equipment 1200 includes a receiver 1210 and a processor 1220, and the receiver 1210 and the processor 1220 are connected by using a bus 1230.

The processor 1220 includes one or more processing cores. The processor 1220 implements various functional applications and data processing by running a software program and a unit.

Optionally, as shown in FIG. 12, the user equipment 1200 further includes a memory 1240, a network interface 1250, and a transmitter 1260, and the memory 1240, the network interface 1250, and the transmitter 1260 are all connected to the receiver 1210 and the processor 1220 by using the bus 1230.

There may be a plurality of network interfaces 1250. The network interface 1250 is used by the user equipment 1200 to communicate with another storage device or network device. The network interface 1250 is optional. During actual application, the user equipment 1200 may communicate with another storage device or network device by using the receiver 1210 and the transmitter 1260. Therefore, the user equipment 1200 may have no network interface. This is not limited in this embodiment of the present disclosure.

The receiver 1210 is configured to receive amount indication information, where the amount indication information is used to indicate a maximum amount of downlink control information.

The processor 1220 is configured to receive downlink control information based on the amount indication information.

Optionally, the receiver 1210 is configured to receive the amount indication information sent by using link layer signaling.

In conclusion, the user equipment provided in this embodiment of the present disclosure receives the amount indication information, and receives the downlink control information based on the amount indication information, where the amount indication information is used to indicate the maximum amount of downlink control information. This can resolve a problem that complexity of blind detection performed by the user equipment is relatively high, thereby reducing the complexity of the blind detection performed by the user equipment.

Optionally, in the embodiments shown in FIG. 9 to FIG. 12, the downlink control information comes from at least one base station.

Optionally, in the embodiments shown in FIG. 9 to FIG. 12, the downlink control information includes at least one type of common downlink control information and user equipment-specific downlink control information.

Optionally, in the embodiments shown in FIG. 9 to FIG. 12, the downlink control information includes the common downlink control information and the user equipment-specific downlink control information.

The amount indication information is used to indicate a maximum amount of common downlink control information and a maximum amount of user equipment-specific downlink control information; or the amount indication information is used to indicate a sum of a maximum amount of common downlink control information and a maximum amount of user equipment-specific downlink control information.

Optionally, in the embodiments shown in FIG. 9 to FIG. 12, the link layer signaling includes data link layer signaling or radio link layer signaling.

Figure 13:
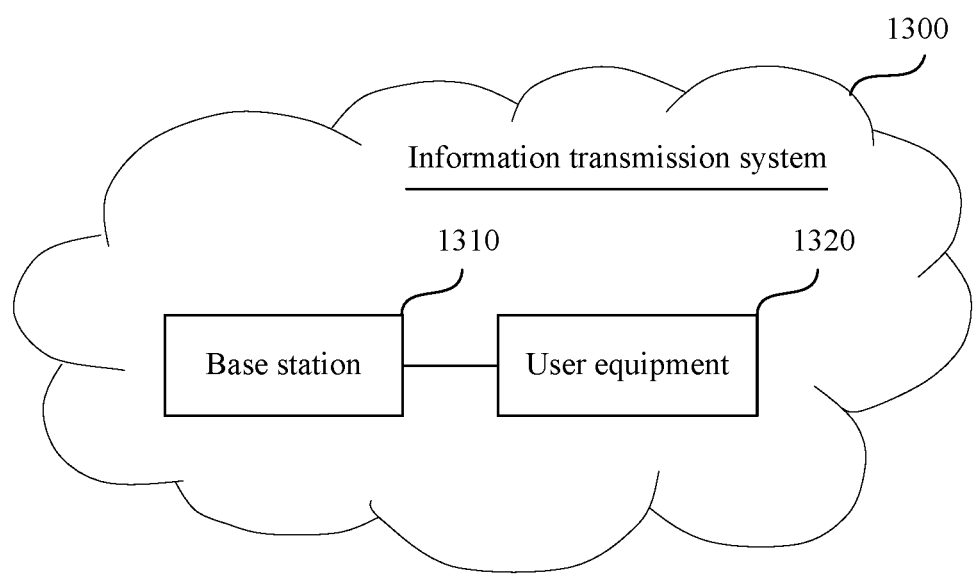
FIG. 13 is a schematic structural diagram of an information transmission system according to an embodiment of the present disclosure.

FIG. 13 is a schematic structural diagram of an information transmission system 1300 according to an embodiment of the present disclosure. Referring to FIG. 13, the information transmission system 1300 includes a base station 1310 and user equipment 1320.

In a possible implementation, the base station 1310 includes the information transmission apparatus 900 shown in FIG. 9, and the user equipment 1320 includes the information transmission apparatus 1000 shown in FIG. 10. In another possible implementation, the base station 1310 is the base station 1100 shown in FIG. 11, and the user equipment 1320 is the user equipment 1200 shown in FIG. 12.

In conclusion, according to the information transmission system provided in this embodiment of the present disclosure, the base station generates amount indication information and sends the amount indication information to the user equipment, where the amount indication information is used to indicate a maximum amount of downlink control information, so that the user equipment receives downlink control information based on the amount indication information. This can resolve a problem that complexity of blind detection performed by the user equipment is relatively high, thereby reducing the complexity of the blind detection performed by the user equipment.

All or some of the foregoing embodiments may be implemented by using software, hardware, firmware, or any combination thereof. When being implemented by using software, all or some of the foregoing embodiments may be implemented in a form of a computer program product, and the computer program product includes one or more computer instructions. When the computer program instructions are loaded and executed on a computer, all or some of the procedures or functions according to the embodiments of the present disclosure are generated. The computer may be a general-purpose computer, a computer network, or another programmable apparatus. The computer instructions may be stored in a computer readable storage medium or may be transmitted from a computer readable storage medium to another computer readable storage medium. For example, the computer instructions may be transmitted from a web site, computer, server, or data center to another web site, computer, server, or data center in a wired (for example, a coaxial cable, an optical fiber, or a digital subscriber line) or wireless (for example, infrared, radio, or microwave) manner. The computer readable storage medium may be any usable medium accessible to the computer, or may be a data storage device, such as a server or a data center, integrating one or more usable media. The usable medium may be a magnetic medium (for example, a floppy disk, a hard disk, or a magnetic tape), an optical medium, a semiconductor medium (for example, a solid-state drive), or the like.

In this application, the character "I" merely describes an association relationship between associated objects, and usually indicates an "or" relationship between the associated objects. For example, LTE/LTE-A indicates LTE or LTE-A, and CoMP/FeCoMP indicates CoMP or FeCoMP.

The sequence numbers of the foregoing embodiments of the present disclosure are merely for illustrative purposes, and are not intended to indicate priorities of the embodiments.

A person of ordinary skill in the art may understand that all or some of the actions, operations, functions, methods, etc., in the foregoing embodiments may be implemented by using hardware or a program instructing related hardware. The program may be stored in a computer readable storage medium. The storage medium may be a read-only memory, a magnetic disk, an optical disc, or the like.

The foregoing descriptions are merely optional embodiments of this application, but are not intended to limit this application. Any modification, equivalent replacement, improvement, or the like made within the spirit and principle of this application should fall within the protection scope of this application.

What is claimed is:

1. An information transmission method, wherein the method comprises:
   generating amount indication information, wherein the amount indication information is used to indicate a maximum amount of downlink control information, wherein the downlink control information comes from at least one base station and comprises at least one type of common downlink control information and user equipment-specific downlink control information, and the amount indication information is used to indicate a maximum quantity of base stations to provide scheduling for user equipment within a predetermined time period; and
   sending the amount indication information to user equipment.

2. The method according to claim 1, wherein
   the amount indication information is used to indicate a sum of a maximum amount of common downlink control information and a maximum amount of user equipment-specific downlink control information.

3. The method according to claim 2, wherein the sending the amount indication information to user equipment comprises: sending the amount indication information to the user equipment by using link layer signaling.

4. The method according to claim 3, wherein the link layer signaling comprises data link layer signaling or radio link layer signaling.

5. An information transmission method, wherein the method comprises:
   receiving amount indication information, wherein the amount indication information is used to indicate a maximum amount of downlink control information; and
   receiving downlink control information based on the amount indication information, wherein the downlink control information comes from at least one base station and comprises at least one type of common downlink control information and user equipment-specific downlink control information, and the amount indication information is used to indicate a maximum quantity of base stations to provide scheduling for user equipment within a predetermined time period.

6. The method according to claim 5, wherein
   the amount indication information is used to indicate a sum of a maximum amount of common downlink control information and a maximum amount of user equipment-specific downlink control information.

7. The method according to claim 5, wherein the receiving amount indication information comprises: receiving the amount indication information sent by using link layer signaling.

8. The method according to claim 7, wherein the link layer signaling comprises data link layer signaling or radio link layer signaling.

9. An information transmission apparatus, wherein the apparatus comprises:
   a generation module, configured to generate amount indication information, wherein the amount indication information is used to indicate a maximum amount of downlink control information, wherein the downlink control information comes from at least one base station and comprises at least one type of common downlink control information and user equipment-specific downlink control information, and the amount indication information is used to indicate a maximum quantity of base stations to provide scheduling for user equipment within a predetermined time period; and
   a sending module, configured to send the amount indication information to user equipment.

10. The apparatus according to claim 9, wherein
    the amount indication information is used to indicate a sum of a maximum amount of common downlink control information and a maximum amount of user equipment-specific downlink control information.

11. The apparatus according to claim 9, wherein the sending module is configured to send the amount indication information to the user equipment by using link layer signaling.

12. The apparatus according to claim 11, wherein the link layer signaling comprises data link layer signaling or radio link layer signaling.

13. An information transmission apparatus, wherein the apparatus comprises:
    a first receiving module, configured to receive amount indication information, wherein the amount indication information is used to indicate a maximum amount of downlink control information; and
    a second receiving module, configured to receive downlink control information based on the amount indication information, wherein the downlink control information comes from at least one base station and comprises at least one type of common downlink control information and user equipment-specific downlink control information, and the amount indication information is used to indicate a maximum quantity of base stations to provide scheduling for user equipment within a predetermined time period.

* * * * *